US007020706B2

(12) United States Patent
Cates et al.

(10) Patent No.: US 7,020,706 B2
(45) Date of Patent: Mar. 28, 2006

(54) METHOD AND SYSTEM FOR AUTOMATICALLY UPDATING MULTIPLE SERVERS

(75) Inventors: Terry Cates, Los Altos, CA (US);
Bruce Wang, Sunnyvale, CA (US);
Sami Shaio, Palo Alto, CA (US)

(73) Assignee: BMC Software, Inc., Houston, TX (US)

( * ) Notice: Subject to any disclaimer, the term of this patent is extended or adjusted under 35 U.S.C. 154(b) by 683 days.

(21) Appl. No.: 10/173,278

(22) Filed: Jun. 17, 2002

(65) Prior Publication Data

US 2004/0024853 A1    Feb. 5, 2004

(51) Int. Cl.
*G06F 15/16* (2006.01)
*G06F 15/173* (2006.01)

(52) U.S. Cl. .................. 709/229; 709/226; 709/203; 709/228; 709/240; 709/242; 718/105

(58) Field of Classification Search ............... 718/100, 718/102, 105; 709/203, 207, 218, 223, 224, 709/225, 226, 227, 229, 213, 228, 240, 242; 714/4, 10, 15
See application file for complete search history.

(56) References Cited

U.S. PATENT DOCUMENTS

| | | | | |
|---|---|---|---|---|
| 5,774,668 A * | 6/1998 | Choquier et al. | | 709/223 |
| 5,951,694 A * | 9/1999 | Choquier et al. | | 714/15 |
| 5,974,409 A | 10/1999 | Sanu et al. | | |
| 6,044,367 A * | 3/2000 | Wolff | | 707/2 |
| 6,067,545 A * | 5/2000 | Wolff | | 707/10 |
| 6,101,508 A * | 8/2000 | Wolff | | 709/223 |
| 6,173,322 B1 * | 1/2001 | Hu | | 709/224 |
| 6,185,601 B1 * | 2/2001 | Wolff | | 709/203 |
| 6,314,465 B1 * | 11/2001 | Paul et al. | | 709/226 |
| 6,658,473 B1 * | 12/2003 | Block et al. | | 709/226 |
| 6,687,735 B1 * | 2/2004 | Logston et al. | | 709/203 |
| 6,728,748 B1 * | 4/2004 | Mangipudi et al. | | 718/105 |
| 6,816,907 B1 * | 11/2004 | Mei et al. | | 709/229 |
| 6,859,882 B1 * | 2/2005 | Fung | | 713/300 |
| 6,886,035 B1 * | 4/2005 | Wolff | | 709/219 |

* cited by examiner

*Primary Examiner*—Majid Banankhah
(74) *Attorney, Agent, or Firm*—Wong, Cabello, Lutsch, Rutherford & Brucculeri, LLP (57) ABSTRACT

A system and method updates multiple servers automatically without taking all of the multiple servers off-line at the same time. The system and method selects a group of servers, takes the group off-line, updates the group taken off-line, and then brings on-line those members of the group that were on-line prior to the update and for which the update was installed successfully.

20 Claims, 4 Drawing Sheets

METHOD AND SYSTEM FOR AUTOMATICALLY UPDATING MULTIPLE SERVERS

RELATED PATENTS

This application is related to U.S. Pat. No. 5,919,247 entitled "Method for the Distribution of Code and Data Updates" issued Jul. 6, 1999 which is hereby incorporated by reference in its entirety.

FIELD OF THE INVENTION

The present invention is related to computer software and more specifically to computer software for updating computer systems.

BACKGROUND OF THE INVENTION

Many web sites and other applications employ a set of servers to serve web pages, files and perform other applications. Some of the servers may duplicate information or functions of other servers to allow more users to simultaneously access the server farm than could be supported by one server alone. A load balancer may be coupled between the servers in the set of servers and the clients that request service from it to allow the load balancer to spread requests for service that may be made to a single address across the multiple servers in the server farm.

As the files and applications on the file servers become out of date, they may be updated. Automated update facilities may be used to update the set of servers. One way to update the servers is to first instruct the load balancer to stop accepting new connections and after a period of time, instruct the load balancer to additionally stop serving existing connections, which brings the servers "off-line". The servers may then be updated using an automated facility, and once updated, the servers are brought back on-line by instructing the load balancer to resume directing connections to the servers.

If all the servers are updated at the same time, automated updating facilities may be used. However, if the servers are all updated at the same time, they are unavailable to perform any work during the update process, and such updates can be the cause of regularly scheduled "outages" of web sites, inconveniencing users. Although it is theoretically possible to manually update servers a portion at a time, doing so would require a human operator to step the automated updating facilities through each of the servers one at a time, which for a large set of servers, could require hours of costly operator time and be prone to error. Other arrangements could be used to speed the process, such as by manually bringing the servers off-line in groups, updating the group and then bringing them back on-line, but such other arrangements are more complex and prone to error and may not avoid the problem of having the entire site brought down if the servers are assigned to specialized functions and the group the operator brings off-line for updating contain all the servers that perform a certain function.

There is another problem with any of these approaches. It is desirable to avoid bringing servers on-line after an update that won't operate properly. For example, servers that were off-line before the update due to malfunctions, or servers for which the update could not be installed properly should not be brought on-line after an update because they may not operate properly. If left off-line after the update, other servers that perform their functions will be used instead.

What is needed is a system and method that can update a set of servers in an automated fashion, without bringing down the entire set of servers and without restoring to service servers that may not operate properly.

SUMMARY OF INVENTION

A system and method segregates the servers in a set into multiple groups. The groups are defined in such a manner that the loss of one group, though reducing the capacity of the set of servers, will not prevent the set of servers from satisfying a request for service. The automated update facility selects one such group at a time, instructs the load balancer to bring the selected group off-line, updates it, and directs the load balancer to bring the group back on-line before moving to the next group. Prior to bringing the servers in a group out of service, the system and method ascertains the status of the servers. The status of the installation of the update is also monitored. When the update is complete, the load balancer is directed to bring back on-line only the servers that were in service prior to the update and for which the installation completed properly.

DETAILED DESCRIPTION OF A PREFERRED EMBODIMENT

Figure 1:
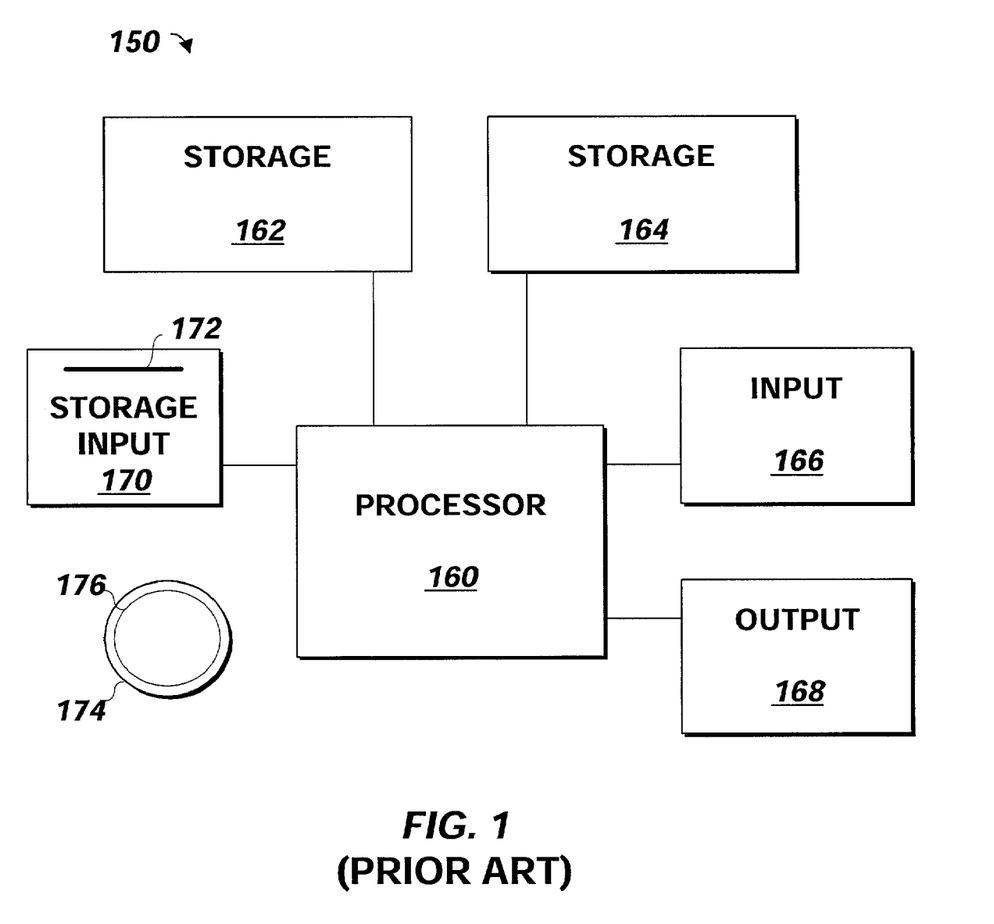
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 10 workstation running the Solaris operating system commercially available from Sun Microsystems of Mountain View, Calif., a Pentium-compatible personal computer system such as are available from Dell Computer Corporation of Round Rock, Tex. running a version of the Windows operating system (such as 95, 98, Me, XP, NT or 2000) commercially available from Microsoft Corporation of Redmond Washington or running the FreeBSD operating system commercially available from the website freebsd.org, or a Macintosh computer system running the MacOS or OpenStep operating system commercially available from Apple Computer Corporation of Cupertino, Calif. and the Netscape browser commercially available from Netscape Computer Corporation of Mountain View, Calif. although other systems may be used.

Figure 2:
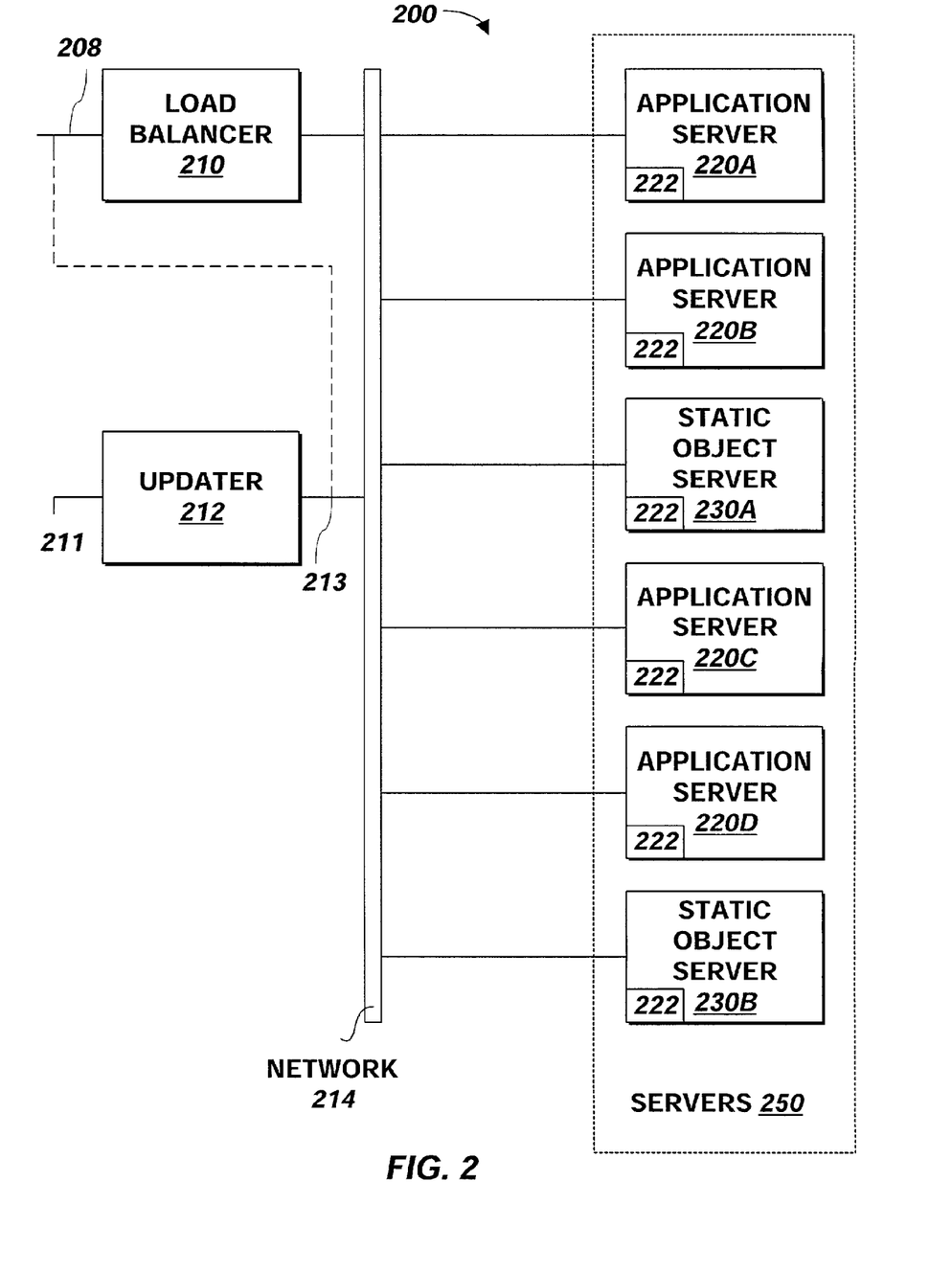
FIG. 2 is a block schematic diagram of a system for automatically updating multiple servers according to one embodiment of the present invention.

Referring now to FIG. 2, a system 200 for automatically updating multiple servers is shown according to one embodiment of the present invention. System 200 consists of load balancer 210, which distributes network connections received at input/output 208 among servers 250.

For purposes of example, four application servers 220A–D and two static object servers 230A–B are shown in the Figure. An application server 220A–D builds web pages before transmitting them, for example by retrieving information from a database, and a static object server 230A–B provides files exactly as stored, each in response to one or more requests. The present invention works with any type of server, not just these types, and any number of types of servers, not just two types, as is used herein for purposes of example. Furthermore, any number of servers of each type may be used.

Load balancer 210 receives requests at input 208, and distributes such requests across multiple servers 250 according to a configuration supplied by a system administrator. When the request corresponds to a source, destination and protocol that is similar or identical to one received recently, the request is said to correspond to an "existing connection" and otherwise, the request corresponds to a "new connection", even if a "connectionless protocol", such as HTTP is used.

The system administrator configures load balancer 210 by providing the address or addresses on which load balancer 250 will receive requests, by providing the addresses of each of servers 250, and by providing the criteria that load balancer 250 uses to determine to which of servers 250 load balancer 250 should forward a particular request. In one embodiment, load balancer 210 accepts requests, examines the request, selects a server 250 to process the request, forwards the request to the selected server 250 (each of which have their own address), and optionally relays any response from the server 250 back to the originator of the request.

Load balancer 210 may forward requests and receive responses via network 214, which is a local area network in one embodiment. There are other types of load balancing devices and the system and method of the present invention may work with any type of load balancer, including those that intercept DNS requests and supply the address of the selected server or redirect requests for service to the selected server.

In one embodiment, responses to the requests are provided from the one of the severs 250 that received the request, and such responses may be returned to the originating client that supplied the request to load balancer 210 by returning the response to the request via network 214 and load balancer 210, although in other embodiments, responses may be returned to the client without passing through load balancer 210, network 214 or either of these.

In one embodiment, load balancer 210 may accept communications intended for a specific one of servers 250 in addition to communications addressed the primary address. In such embodiment, when a request arrives containing a destination address that corresponds to one of the servers 250, load balancer 210 receives and forwards the request to the indicated server 250, and optionally relays any response back to the originator of the request as described above.

Figure 3:
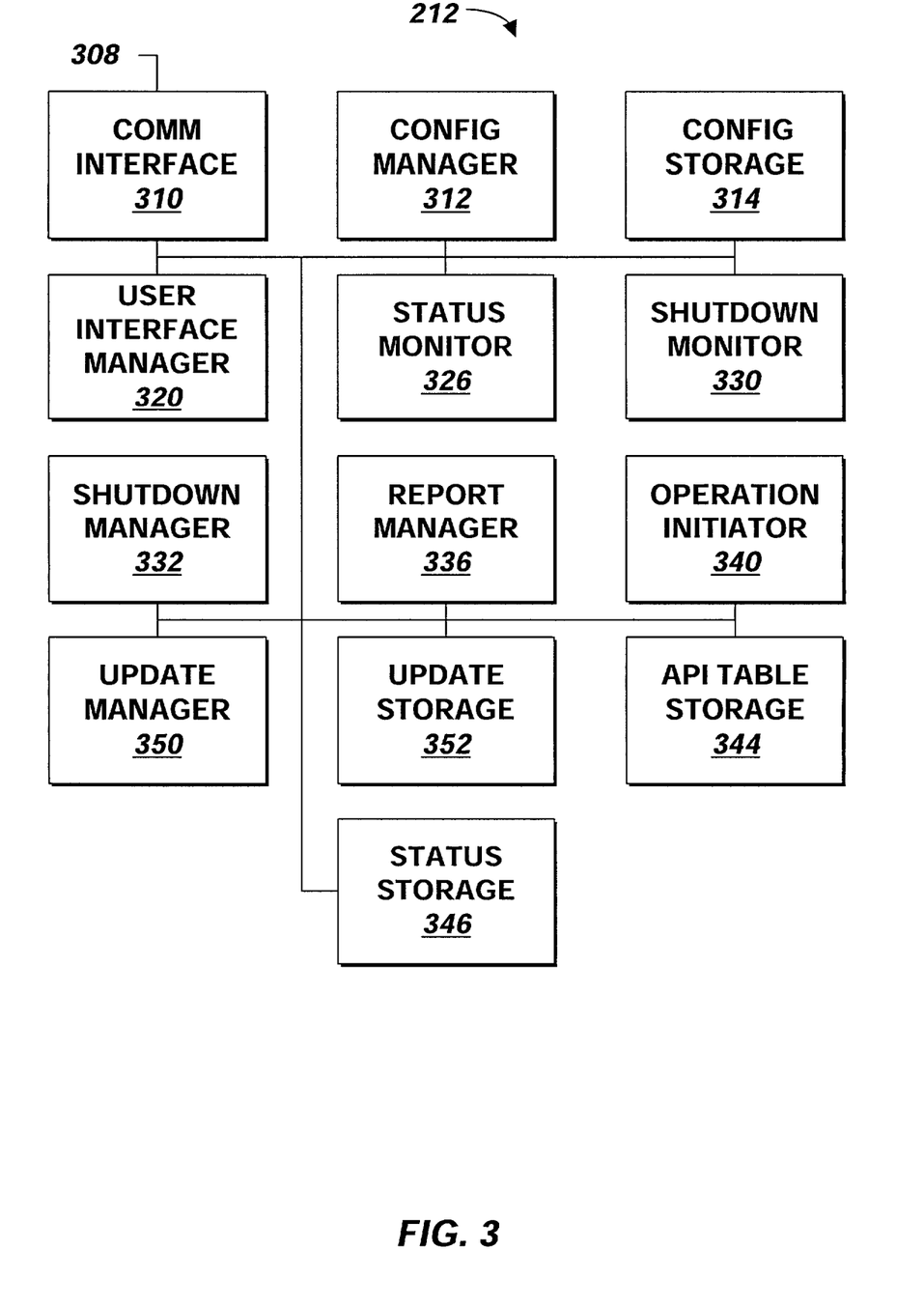
FIG. 3 is a block schematic diagram of updater 212 of FIG. 2 in more detail according to one embodiment of the present invention.

In one embodiment, to control operation of system 200, the operator of system 200, referred to herein as the "system administrator", provides configuration information to updater 212. FIG. 3 is a block schematic diagram showing updater 212 of FIG. 2 in more detail according to one embodiment of the present invention.

The system administrator uses user interface manager 320 to supply information via communication interface 310 and input/output 308, which is coupled to a conventional keyboard and display. In one embodiment, all communication into or out of updater 212 is made via input/output 308 of communication interface 310. Communication interface 310 includes a conventional communication interface that supports Ethernet, TCP/IP, or other conventional communication protocols and may include interface facilities for direct connection of a keyboard/mouse and monitor. Input/output 310 of communication interface 310 may be coupled to input/outputs 211, 213 of updater 212.

As described in more detail below, the system administrator supplies to user interface manager 320: (1) information regarding the topology of the network of which load balancer 210, updater 212, and servers 250 are a part; (2) an identifier of the load balancer 210 or other indication of the application programming interface (API) that load balancer 210 supports; and (3) operational parameters, such as how often or when to update servers 250, the identifiers of servers are executing essentially identical tasks or an identification of groups of servers that can be brought down together, and the amount of time that should elapse between a request to refuse all further new connections for a server 250 and the request to shut down that server 250. This information will now be described.

As part of the topology information described above, the system administrator may provide to user interface manager 320 the IP addresses of the load balancer 210, updater 220 and the network protocols used. In addition, the system administrator provides one or more addresses for each of servers 250, as will now be described.

In one embodiment, each of the servers 250 may have one or more identifiers, which may be the one or more IP addresses that are used to send communications, including requests, to each of the servers 250. In some topologies, there are at least two TCP/IP capable Ethernet interfaces on each of the servers 250, one that load balancer 210 uses to send communications to the server and another that may be used by updater to send updates to the server if, for example, load balancer 210 does not have the capability to forward messages addressed to the server that load balancer 210 receives at input 208.

The network topology information provided by system administrator to user interface manager 320 may include the IP address of each server input/output used by the load balancer 210 to provide communications received at input/ output 208, an indication of whether each of the servers 250 should receive updates via load balancer 210 or should receive them via another IP address, and if so, the IP address and port of that should be used to update each server.

In one embodiment, the system administrator supplies to user interface manager 312 information about the API or command structure that load balancer 210 supports. Various makes, models, and brands of load balancer 210 support different interfaces, commands, features, and reporting options. The system administrator describes to user interface manager 320 make and model information about load balancer 210, for example, by selecting it from a list of makes and models supported by updater 212, which updater 212 later uses to generate syntactically correct commands and requests when communicating with load balancer 210, as described below. In one embodiment, the make and model of the load balancer is the information provided to indicate the information about the API or command structure supported by load balancer 210.

When user interface manager 320 receives all of the information described above (and certain information described below), it supplies it to configuration manager 312. Configuration manager 312 uses the information supplied to build and store a configuration file in configuration storage 314, which may be conventional memory or disk storage. The use of a configuration file allows the information to be preserved and reused. For example, in one embodiment, configuration manager 312 reads the configuration file on startup for use as described herein.

In server collections that are expected to support a high connection rate, the system administrator often configures sets of multiple servers with certain identical capabilities, so that any member of the set may respond to an identical request. For example, application servers 220A–D are designated as being in one set and static object servers 230A–B are designated as being in a different set. In one embodiment, the system administrator designates servers 250 as being in a set by assigning a type to each server via user interface manager 320, with each server in a set being designated with the same type. A server configured with certain identical capabilities as another server is said to have a "type" that is the same as the other server using this strategy, a request routed through a load balancer could be forwarded to any member of the set of the same type of servers, thus effectively multiplying the number of requests to which servers 250 can respond when the request is made to a given IP address.

In one embodiment, servers are assigned to groups so that updating may be performed a group at a time. The servers are assigned to a group by ensuring that a group will not contain all of the members of the same set containing the same type of servers. This allows a group to be taken out of service for updating while ensuring that at least one member of every set (e.g. one server of every type) is in service to respond to requests. In one embodiment, the servers from each set are somewhat evenly spread among the groups to the extent possible to minimize the effect on service when any one group is taken off-line to update it.

In one embodiment, each of the servers 250 may be assigned to a group by the system administrator using user interface manager 220 and such information is provided to configuration manager 312 for storage in the configuration file in configuration storage 314.

In another embodiment, the system administrator uses user interface manager 320 to identify each server as being of a certain type and user interface provides this information to configuration manager 312 for storage in the configuration file in configuration storage 314. In this embodiment, configuration manager 312 assigns the servers 250 to various groups. In such embodiment, the system administrator may specify to user interface manager 320 the number of groups (e.g. two) and user interface manager 320 supplies the number of groups to configuration manager 312. In another embodiment, configuration manager 312 determines the number of groups by identifying the set with the smallest number of members or the smallest number of members on-line, and uses that number as the number of groups to which the servers should be assigned. In another embodiment, the number of groups is fixed at a specific number, such as two.

In one embodiment, when sufficient information is received from user interface manager 320, configuration manager 312 assigns each of the servers 250 to a group as described above. However, it is not necessary that configuration manager 312 make the assignment of servers to groups at the time the information is received from user interface manager 312. In one embodiment, configuration manager performs such assignment of servers 250 to groups just before it begins the update process. This allows servers to be assigned to groups using additional constraints, if possible, such as: "no one group will have all of the servers of a particular type that are in service just before the update process is begun", or "servers of the same type that are on-line are distributed as evenly as possible", or "the number of groups will be equal to the smallest number of servers that are a) on-line just before the update process is begun and b) of the same type". In this manner, if there are four servers of a particular type, and two of the servers of that type of four are out of service, the remaining two servers will not be assigned to the same group and therefore simultaneously taken out of service for updating.

Periodically, updater 212 updates the servers 250. The period in which the servers are updated may be specified by the system administrator using user interface manager 320, which provides it to configuration manager 312 for storage in the configuration file in configuration storage 314 as described above. The system administrator may initiate the performance of an update as described herein. Upon the start of the update process described below, shutdown manager 332 signals operation initiator 340, which adds the duration stored in the configuration file to the system clock and computes a time to begin the next update. Operation initiator 340 sets one or more operating system timers or reminder programs to cause an operating system (not shown) or reminder program to signal operation initiator 340 when the next update is scheduled to occur. When so signaled, operation initiator 340 signals configuration manager 312 to repeat the update process. This allows updates to be regularly scheduled.

As described above, the assignment of servers 250 to groups may be made immediately prior to the updating of the servers. In one such embodiment, configuration manager 312 signals status monitor 326 to provide the status of all of the servers 250. Status monitor 326 requests and receives an indication of the make, model, and/or brand, and the address, of load balancer 210 from configuration manager 312, which locates such model and address information in the configuration file in configuration storage 314 and returns the model and address information to status monitor 326. Status monitor 326 receives the model and address information and uses the model information as an index to an API table in API table storage 344 to retrieve the syntax of the desired API command and any response, which in this case is the command to request the on-line or off-line status of each server having an entry in the status table in status storage 346. API table storage 344 contains a table of the commands that may be sent to load balancer 210 depending on the make and model of load balancer 210. If a command is not available on a particular load balancer 210, that fact is noted in the API table in API table storage 344, and alternate commands may be selected or certain steps in the procedure may be ignored as a result of the unavailable command. The API table may be provided with updater 212 or provided by the system administrator via user interface manager 320 and the API table may be stored in a file. It isn't necessary to use a table: in one embodiment, the information described herein as being in an API table is hard coded into the elements described herein as accessing the API table.

If a single command may be used to request a list of the on-line or off-line status of all servers 250, status monitor 326 sends the command to request such status and receives the list. If the status of each of the servers 250 must be individually requested to determine which of the servers 250 are off-line, status monitor 326 uses the identifiers of the servers in the status table, built as described below, to send a command to request from load balancer 210 the status of each of the servers 250, one server at a time. Status monitor 326 provides the status of each of the servers, along with the IP address or other identifier of the server, to configuration manager 312.

Configuration manager 312 builds a status table in update storage 352. The status table is a table of entries, with one entry for each server 250. Each entry contains the IP address or addresses or other identifier of each server stored in configuration storage 314. In addition, entries contain flags which may be marked (e.g. set or cleared to indicate a certain status) as described herein corresponding to certain status information. Configuration manager 312 adds to the status table the on-line or off-line status of each server, that configuration manager 312 receives from status monitor 326.

Another flag in the status table identifies the server as being in the current group. The current group is one or more of the groups identified as described above that is in the process of being updated as described herein. Configuration manager 312 either assigns the servers 250 to groups as described above or retrieves such assignment from the configuration file, selects the first group, and marks the entries in the status table for those servers as being in the current group. It is noted that, in one embodiment, servers having an off-line status may be assigned to a group, so that they may be updated if possible. In one embodiment, after configuration manager 312 has identified the servers in the first group as being in the current group, configuration manager 312 signals status monitor 326.

Status monitor 326 receives the signal from configuration manager 312 and identifies any of the servers 250 having entries in the status table in status storage 346 that are marked as in the current group and that are currently off-line.

Status monitor 326 then requests and receives an indication of the make and model and the address, of load balancer 210 from configuration manager 312, which locates such model and address information in the configuration file in configuration storage 314 and returns the model and address information to status monitor 326. Status monitor 326 receives the model and address information and uses the model information as an index to an API table in API table storage 344 to retrieve the syntax of the desired API command and any response, which in this case is the command to request the on-line or off-line status of each server having an entry in the status table in status storage 346 that is marked as being in the current group.

If a single command may be used to request a list of all servers off-line, status monitor 326 sends the command to request it and receives the list. If the status of each of the servers 250 must be requested to determine which of the servers 250 are off-line, status monitor 326 uses the identifiers of the servers in the status table that are marked as available for updating to send a command to request from load balancer 210 the status of each of the servers 250, one server at a time. If the status of all servers must be requested, status monitor 326 requests it.

Status monitor 326 receives the status of each of the servers described above, and stores an indication of the on-line or off-line status of each server 250 marked as in the current group in the corresponding entry for that server in the status table in status storage 346. Once status monitor 326 has determined and stored the status of each server 250 identified in the configuration file in configuration storage 314, status monitor 326 signals shutdown manager 332.

Shutdown manager 332 manages the orderly shutdown of servers 250 marked as in the current group. To manage the orderly shutdown of such servers 250, shutdown manager 332 requests the model information and address of load balancer 210 from configuration manager 312 as described above, and uses the model information and the API table in API table storage 344 to determine if load balancer 210 supports a command to stop directing new connection requests to a particular one of the servers 250. If so, shutdown manager 332 retrieves the correct API syntax from the API table in API table storage 344 and sends to load balancer 210 a request to stop directing new connections to each server 250 marked in the status table as being in the current group. To send the refuse new connection requests, for each server marked as in the current group in the status table in status storage 346, shutdown manager 332 extracts the server identifier from the selected status table entry, and sends to load balancer 210 a command to stop forwarding new connections to the server having the extracted server identifier.

Because load balancer 210 stops forwarding new connections to the servers in the current group, load balancer 210 will direct new connections to servers in groups other than the current group. If the load balancer provides such a capability, by waiting a relatively short time before directing load balancer 210 to take the servers in the current group off-line, because no new connections will have been initiated, and some or all of the existing connections will have sufficient time to terminate naturally, disruption of users is minimized or even eliminated when such servers are subsequently taken off-line.

Shutdown manager 332 requests and receives the shutdown wait time from configuration manager 312. The shutdown wait time is provided in the configuration file by the system administrator, and represents the maximum amount of time after load balancer 210 is instructed to refuse new connections to the servers in the selected group, before taking those servers 250 off-line. Shutdown manager 332 sends the shutdown wait time to an operating system timer (not shown), which signals when the time has elapsed.

In one embodiment, once shutdown manager 332 has sent to load balancer 210 a refuse new connections request for each server marked as available for shutdown, shutdown manager 332 signals shutdown monitor 330. Shutdown monitor 330 monitors the status of servers marked as being in the current group to determine if existing connections have terminated prior to the time the system timer set by shutdown manager 332 elapses. This can allow the update process to proceed more rapidly if the load balancer 210 supports the capability to provide the status of servers 250.

To monitor the status of the servers, shutdown monitor 330 requests and receives the address and model number of load balancer 210 from configuration manager 312 and uses this information to request the idle status of all servers or each server having an entry marked in the status table as being in the current group. In one embodiment, load balancer 210 will report as idle any server that has not received a request for a certain period of time in one embodiment, or for which all connections have explicitly terminated in another embodiment, or both in still another embodiment. In another embodiment, load balancer 210 simply reports the time of the last request received and assigned to a server. In this case, the system administrator specifies to user interface manager 320 such amount of time that should elapse when a server is considered idle and such amount of time is provided from system administration manager 320 to configuration manager 312 and stored in the configuration file in configuration storage 314. Shutdown monitor 330 requests the idle time from configuration manager and compares it to the amount of time elapsing since the latest request was assigned by load balancer 210 to any of the servers marked as being in the current group. When such amount of time meets or exceeds the idle time stored in the configuration file in configuration storage 314, or if load balancer 210 reports all servers in the current group as being idle, shutdown monitor 330 signals shutdown manager 332.

When the timer or shutdown monitor 330 signals shutdown manager 332, shutdown manager 332 requests and receives the load balancer address and model information and determines API syntax as described above, and sends a command to load balancer 210 to suspend communications to the servers 250 having entries in the status table marked as being in the current group as described above. Shutdown manager 332 may signal the other of timer or shutdown monitor 330 (e.g. the one other than the one from which it received the signal) so that the other device does not signal shutdown manager 332 as described above.

Shutdown manager 332 receives the signal, determines the load balancer 210 address and API syntax as described above, sends one or more commands to load balancer 210 to suspend routing requests to each server 250 with a status table entry in status storage 346 marked in the status table as being in the current group.

In one embodiment, if the end of the timer is reached, shutdown manager 332 again signals shutdown monitor 330 to monitor the status of the servers 250 marked in the status table as being in the current group as described above. If all of the servers so marked are not idle, instead of directing the load balancer 210 to suspend communications to the servers 250 marked as being in the current group, shutdown manager 332 terminates the further operations described herein and indicates to report manager 336 that the update operation was aborted. Report manager 336 provides a report to the system administrator indicating that operations were aborted. In one embodiment, this capability only applies to the first group selected: once the first group is updated, any other groups are updated even if all servers are not idle. In still another embodiment, shutdown manager 332 provides identifiers of individual servers not idle to configuration manager 312, which removes them from the current group and assigns them to another to provide more time for such servers to become idle, provided that, in the current group, there are other servers of the same type as a server being moved into a different group. In one embodiment, this capability is an option selected by the system administrator using user interface manager 320, which provides an indication of the selected option to configuration manager 312 for storage in the configuration file in configuration storage 314. Status manager 332 requests the value of the option from configuration manager 312 and operates using the embodiments described above in response to the value of the option.

Update manager 350 receives the signal, and either updates those servers 250 marked in the status table as being in the current group as described above or directs an update handler 222 in those servers 250 to initiate the update process using any conventional method of updating a computer system, such as those described in the related U.S. patent listed above. This method may include the update handler 222 in the server 250 sending an identifier of the files installed on the server 250, having update manager 350 determine what actions, if any, should be taken to update that server 250 and sending to the update handler 222 any files needed to update the server 250, a list of the files, and instructions for updating the server 250 and having the update handler 222 perform the actions using any such files. In the related application, update handler 222 is referred to as a tuner and update manager 350 is referred to as a transmitter or its proxy.

In one embodiment, update manager 350 provides such updates for a given server to the same IP address used by load balancer 210 to forward requests to such server via load balancer 210. In another embodiment, update manager 350 provides such update information to the other IP address stored in the status table as described above, bypassing load balancer 210, such as via network 214, which may be accessed via a router and the Internet.

Update handler 222 attempts to apply the update, and sends a response to update manager 350 indicating whether or not the update attempt was successful.

Update manager 350 receives and examines the response, and updates the status table entry corresponding to server 250 on which the update attempt was made to indicate either success or failure of the update. If no update was necessary, the response received by update manager 350 will either indicate that the update was successful or that no update was required, and either response is treated as a successful update by update manager 350.

Update manager 350 performs the functions described above for each server 250 that provides a response. If, within a certain period of time after update manager provides update information to the servers 250 marked as being in the current group, no such response is received from one or more of the servers 250 marked as in the current group, update manager 350 marks the status table entry for each such server as if the update was reported as unsuccessful and also marks the entry as not having responded to the update. In one embodiment, this period of time is provided by the system administrator to user interface manager 320, which provides it to configuration manager 312 for storage in the configuration file in configuration storage 314 and update manager 350 requests it from configuration manager 312. Once update manager 350 has marked the success or failure of the update for all entries for servers 250 marked as in the current group as described above, update manager 350 signals shutdown manager 332 and configuration manager 312.

Shutdown manager 332 receives the signal, and provides one or more commands to load balancer 210 that will have the effect of bringing back on-line those servers 250 a) marked as being in the current group, b) marked as on-line in the status table, and c) whose updates are not marked as having failed in the status table. To identify and bring these servers 250 on-line, shutdown manager 332 determines the load balancer 210 address and correct API syntax as described above, scans the status table in status storage 346, and requests load balancer 210 to bring on-line each server 250 whose corresponding status table entry matches all of the criteria a, b and c listed above.

In one embodiment, shutdown manager 332 signals shutdown monitor 330 to monitor the status of each updated server 250 thus brought on-line as described above in order to ensure that newly updated servers 250 are functioning correctly. Such monitoring may be performed by requesting status from load balancer 210 or by attempting to communicate with each server in the current group. If shutdown monitor 330 determines abnormal functioning of a server 250, then shutdown monitor 330 updates the status table entry in status storage 346 corresponding to the abnormally functioning server 250 to indicate update failure.

Configuration manager 312 receives the signal from update manager 350 and uses entries in the status table marked for update and the assignment of servers to groups in configuration storage to identify the group or groups of servers that were updated as described above. Configuration manager 312 unmarks in the status table in update storage 352 the entries marked as being in the current group, identifies the servers 250 in another group not already selected since operation of updater 212 was last initiated and marks their entries in the status table as being in the current group.

Configuration manager 312 then signals status monitor 326, and the process described above is repeated until all groups of the servers 250 are processed as described above.

When no additional groups remain, configuration manager 312 signals report manager 336.

Report manager 336 receives the signal and reports on the status of the updates and servers 212. To produce the report, report manager 336 scans the status table in status storage 346, formats the contents of the status table into a report, and sends the report to the system administrator. In one embodiment, the report indicates, for each of the servers 350, the status of each server before the update was applied to the server, whether the update completed successfully and optionally, the status of the server if it was checked after the update was applied. In one embodiment, report manager 336 sends the report via e-mail. In one embodiment, report manager 336 sends the report to a printer via communication interface 310 and input/output 308.

In one embodiment, if any status table entries indicate an update failure, report manager 336 sends a page, or calls a cell phone, or sends a text message to a cell phone or a pager or other wireless device, alerting the system administrator to the failure. In one embodiment, update manager 350 will signal report manager 336 to provide such notification immediately upon detection of the update failure.

Figure 4:
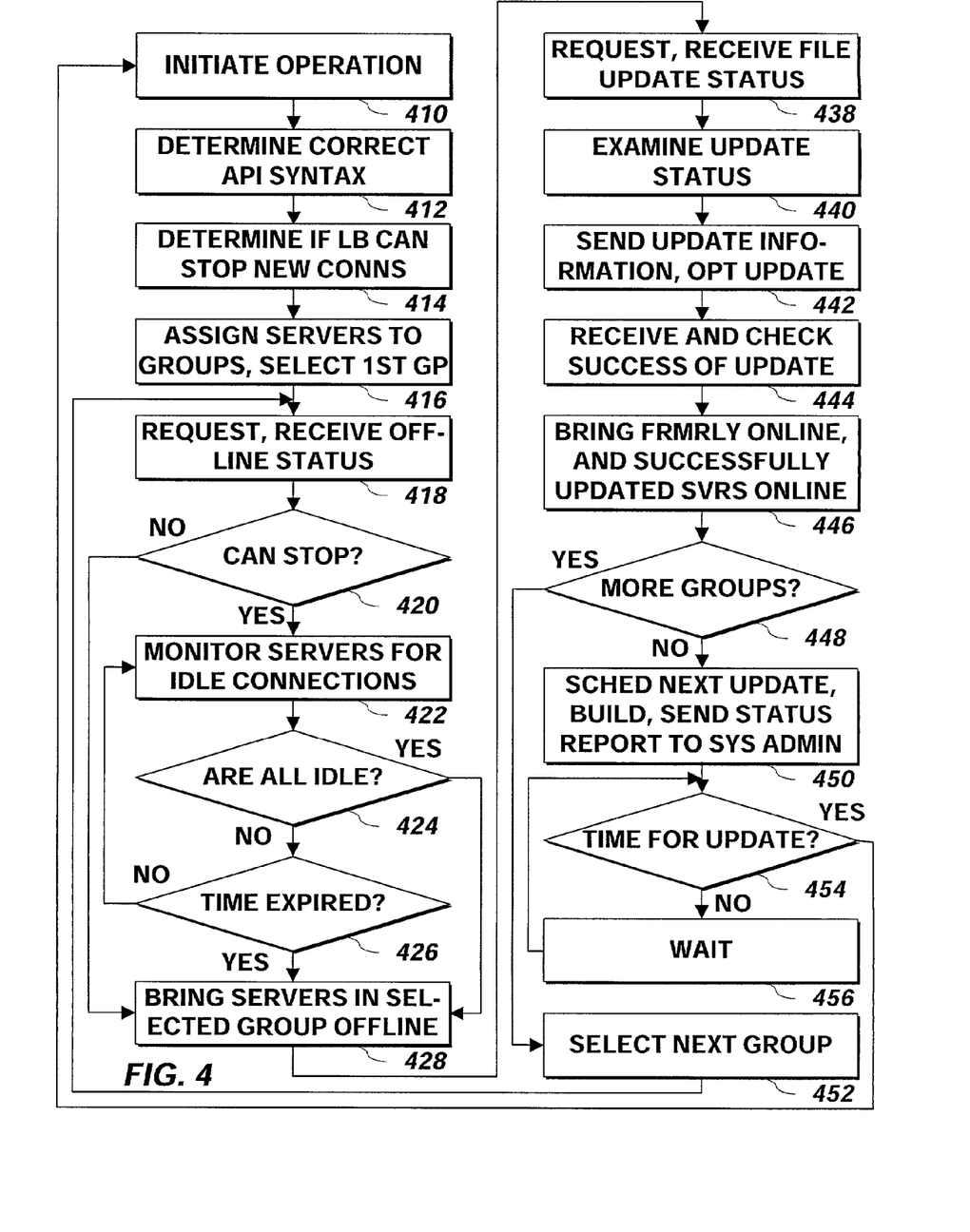
FIG. 4 is a flowchart illustrating a method of automatically updating multiple servers according to one embodiment of the present invention.

Referring now to FIG. 4, a flowchart illustrating a method of automatically updating multiple servers is shown according to one embodiment of the present invention. Operation is initiated as described above 410, and the correct API format and/or syntax for commands are determined 412 as described above for use as described below. Step 412 may be repeated at various locations in the method as described above. A determination is made as to whether the load balancer supports instructions to stop forwarding new connections to the servers in the selected group 414. The servers are assigned to two or more groups and a first group is selected as the current group and the servers in the selected group are marked as described above 416. Step 416 may include requesting and receiving the off-line status of each server as described above. The off-line status of each server in the selected group is requested and received 418 as described above. In one embodiment, step 416 follows step 410 and steps 412 and 414 follow step 416.

If one or more instructions to stop forwarding new connections are supported by the load balancer 420, an instruction is provided to stop forwarding all new connections to the servers in the selected group 422, and the servers in the selected group are optionally monitored for the termination of all connections 420 as described above. If all servers in the selected group are idle 422, then the method continues with step 428. If all servers in the selected group are not idle 422, then a check is made to determine if the waiting period has expired. If the waiting period has not expired 424, then the method continues with step 422 and otherwise 424, the method continues at step 428. If at step 420, the load balancer does not support instructions to stop forwarding new connections to the server, the method continues at step 428.

Continuing now at step 428, the servers in the selected group are brought off-line 428, each server in the selected group is sent a request to begin the update process, and one or more indications of the file status of each server is received 428 as described above. In one embodiment, step 428 includes checking an option and if the option indicates that servers not idle are not to be brought off-line, step 428 may include terminating the method, terminating the method if the current group is the first group or reassigning non-idle servers as described above, in response to the option.

The file status is examined 440 as described above. Update information and optionally, update files, are sent 442 to the servers in the selected group, and a message indicating the success or failure of the updates is received and examined 444 as described above.

The servers in the selected group that were successfully updated and were on-line when last checked at step 418 are brought back on-line 446. If there are more groups not already selected 448, another group not already selected is selected 452 and the method continues at step 418 using the newly selected group of servers. Otherwise 448, the next update is scheduled (or such function may be part of step 410 as described above) and a status report is generated and sent 450 to the system administrator as described above. Step 450 or 444 may include informing the system administrator that an update did not complete successfully as described above.

If the scheduled time for an update has occurred 454, the method continues at step 410 and otherwise 454, the method waits 456 for the time to occur, such as by scheduling a timer or reminder as described above.

What is claimed is:

1. A server updating method, comprising:
 allocating each of a plurality of servers to various ones of a plurality of groups, each server having at least one type, each group comprising, for at least one of the at least one type, fewer then all of the servers having a same type;
 selecting at least one first group of the plurality of groups;
 identifying a status related to servers in the first group;
 providing at least one first command to suspend directing of communications by at least one load balancer to servers in the first group, said first command not suspending the directing of communications to servers in at least one of the other groups;

updating information at servers in the first group for which the directing of communications is suspended; and based on the status identified, providing at least one second command to resume the directing of communications by the at least one load balancer to at least one server containing updated information in the first group.

2. The method of claim 1, wherein providing the at least one first command to the at least one load balancer to suspend directing of communications to servers in the first group comprises:

identifying a type of load balancer;
retrieving the at least one first command from a set of commands for a plurality of types of load balancers based on the identified type of load balancer; and
providing to the identified type of load balancer the at least one first command retrieved.

3. The method of claim 1, additionally comprising suspending the directing of new connections by at least one load balancer to servers in the first group.

4. The method of claim 3, wherein suspending the directing of new connections by at least one load balancer comprises:

identifying a type of load balancer;
retrieving at least one suspension command from a set of commands for a plurality of types of load balancers based on the identified type of load balancer; and
providing the at least one suspension command retrieved to the identified type of load balancer.

5. The method of claim 1, additionally comprising:
selecting a second group different from the first group;
identifying a status related to servers in the second group;
providing at least one third command to suspend directing of communications by at least one load balancer to servers in the second group, said third command not suspending the directing of communications to servers in at least one of the other groups;
updating information at servers in the second group for which the directing of communications is suspended; and
based on the status identified, providing at least one fourth command to resume the directing of communications by the at least one load balancer to at least one server containing updated information in the second group.

6. The method of claim 1, wherein the status related to servers in the first group comprises, for each of said servers, a status related to directing of communications to that server.

7. The method of claim 1, additionally comprising receiving at least one indication regarding a success of the updating step, wherein resuming the directing of communications is additionally based on the indicated success of the updating step.

8. A server updating system comprising:
a configuration manager configured to:
receive information regarding a plurality of servers, each server having at least one type, allocate each of the plurality of servers to various ones of a plurality of groups based on information received, each group comprising, for at least one of the at least one type, fewer than all of the servers having a same type;
select at least one first group of the plurality of groups; and
provide at least one first identifier corresponding to at least one server in the first group;

a status manager configured to:
receive the at least one first identifier,
provide a request for status related to the at least one server in the first group;
receive a response to the request; and
provide an indication of status based on the response received;

a shutdown manager configured to:
receive the at least one first identifier;
provide at least one first command to suspend directing of communications by at least one load balancer to servers in the first group, said first command not suspending the directing of communications to servers in at least one of the other groups, and
provide a signal verifying the at least one first command provided; and an update manager configured to:
receive the signal from the shutdown manager, and
provide information useful for updating servers in the first group;
wherein the shutdown manager is additionally configured to provide, based on the indication of status, at least one second command to resume directing of communications by the at least one load balancer to at least one of the servers having received information useful for updating the servers.

9. The system of claim 8, wherein the shutdown manager is additionally configured to:
receive an identifier of a type of load balancer;
retrieve the at least one first command from a set of commands for a plurality of types of load balancers based on the identified type of load balancer; and
provide to the identified type of load balancer the at least one first command retrieved.

10. The system of claim 8, wherein the shutdown manager is additionally configured to provide at least one suspension command to suspend the directing of new connections by at least one load balancer to servers in the first group before suspending the directing of communications to servers in the first group.

11. The system of claim 10, wherein the shutdown manager is additionally configured to:
receive an identifier of a type of load balancer;
retrieve the at least one third command from a set of commands for a plurality of types of load balancers based on the identified type of load balancer; and
provide to the identified type of load balancer the at least one third command retrieved.

12. The system of claim 8, wherein:
the configuration manager is additionally configured to:
select a second group different from the first group, and
provide at least one second identifier corresponding to at least one server in the second group;
the status manager is additionally configured to:
receive the at least one second identifier,
provide a request for status related to the at least one server in the second group;
receive a response to the request; and
provide an indication of status based on the response received;
the shutdown manager is additionally configured to:
provide at least one third command to suspend directing of communications by at least one load balancer to servers in the second group, said third command not suspending the directing of communications to servers in at least one of the other groups;

the update manager is additionally configured to provide information useful for updating information at servers in the second group for which the directing of communications is suspended; and the shutdown manager is additionally configured to provide, based on the indication of status, at least one fourth command to resume directing of communications by the at least one load balancer to at least one of the servers containing updated information in the second group.

13. The system of claim 8, wherein the status related to servers in the first group comprises, for each of said servers, a status related to directing of communications to that server.

14. The system of claim 8, wherein:

the update manager is additionally configured to:
    receive at least one indication regarding a success of the updating step, and
    provide at least one status message based on the at least one indication; and the shutdown manager is additionally configured to:
    receive the at least one status message; and
    provide the at least one second command based on the at least status message received.

15. A computer program product comprising a computer useable medium having computer readable program code embodied therein for updating servers, the computer program product comprising computer readable program code devices configured to cause a computer to:

allocate each of the plurality of servers to various ones of a plurality of groups, each server having at least one type, each group comprising, for at least one of the at least one type, fewer than all of the servers having a same type;

select at least one first group of the plurality of groups;

identify a status related to servers in the first group;

provide at least one first command to suspend directing of communications by at least one load balancer to servers in the first group, said first command not suspending the directing of communications to servers in at least one of the other groups;

update information on servers in the first group for which the directing of communications is suspended; and based on the status identified, provide at least one second command to resume the directing of communications by the at least one load balancer to at least one of the servers containing updated information in the first group.

16. The computer program product of claim 15, wherein to suspend directing of communications, the computer readable program code devices are configured to cause the computer to:

identify a type of load balancer;

retrieve the at least one first command from a set of commands for a plurality of types of load balancers based on the identified type of load balancer; and provide to the identified type of load balancer the at least one first command retrieved.

17. The computer program product of claim 15, additionally comprising computer readable program code devices configured to cause the computer to suspend the directing of new connections by at least one load balancer to servers in the first group.

18. The computer program product of claim 17, wherein to suspend the directing of new connections by at least one load balancer, the computer readable program code devices are configured to cause the computer to:

identify a type of load balancer;

retrieve at least one suspension command from a set of commands for a plurality of types of load balancers based on the identified type of load balancer; and provide the at least one suspension command retrieved to the identified type of load balancer.

19. The computer program product of claim 15, additionally comprising computer readable program code devices configured to cause the computer to:

select a second group different from the first group;

identify a status related to servers in the second group;

provide at least one third command to suspend directing of communications by at least one load balancer to servers in the second group, said third command not suspending the directing of communications to servers in at least one of the other groups;

update information at servers in the second group for which the directing of communications is suspended; and based on the status identified, provide at least one fourth command to resume the directing of communications by the at least one load balancer to at least one of the servers containing updated information in the second group.

20. The computer program product of claim 8, additionally comprising computer readable program code devices configured to cause the computer to:

receive at least one indication regarding a success of the update; and resume the directing of communication additionally based on the indicated success.

\* \* \* \* \*